United States Patent Office 3,480,096
Patented Nov. 25, 1969

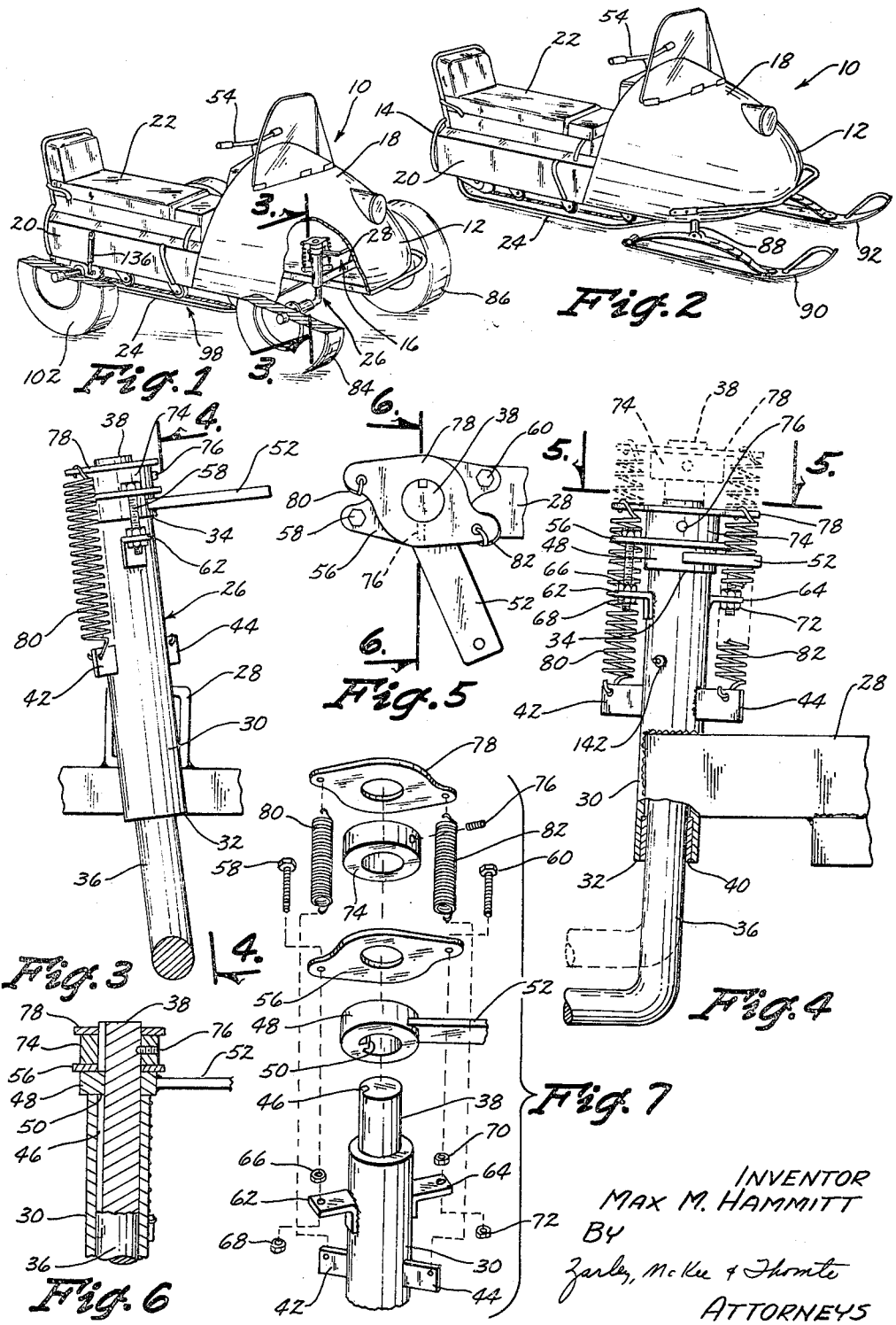

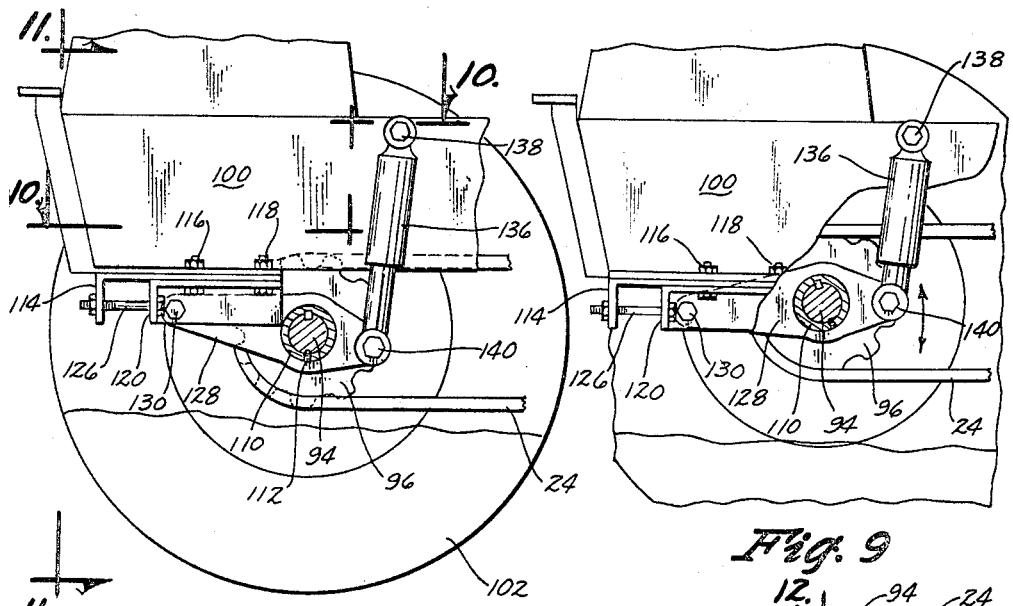
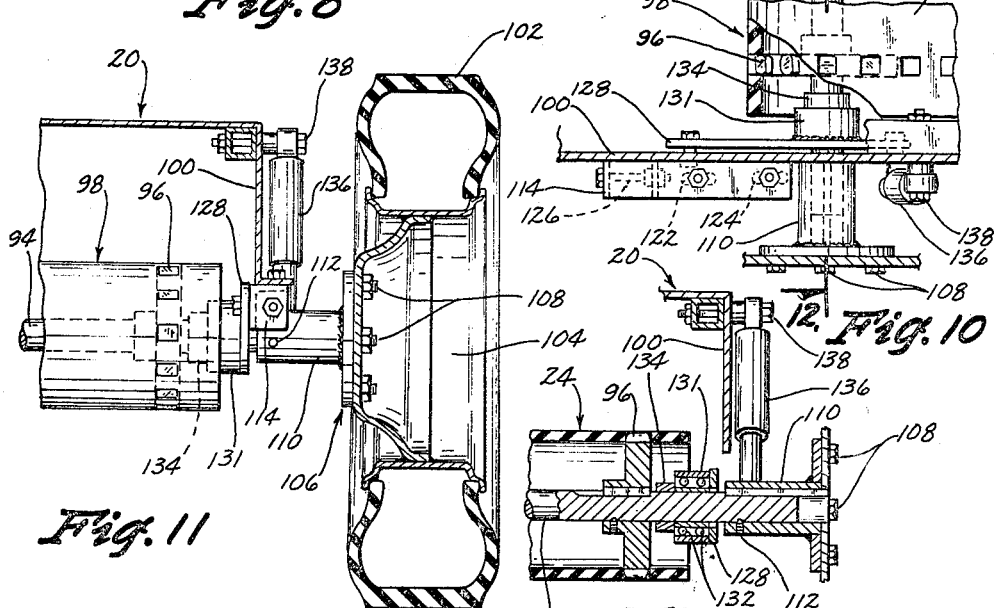

3,480,096
SUSPENSION SYSTEM FOR A SNOW VEHICLE
Max M. Hammitt, 1434 Arthur Drive,
Ames, Iowa 50010
Filed Jan. 18, 1968, Ser. No. 698,748
Int. Cl. B62m 27/00
U.S. Cl. 180—5                    12 Claims

ABSTRACT OF THE DISCLOSURE

A suspension system for a convertible snow vehicle having steering skis at its forward end for steering the vehicle and a track means at its rearward end for propelling the vehicle. The steering skis are each secured to a spindle which forms a portion of the front suspension system. The spindle is quickly and easily removed from the front suspension system and may be replaced by a second spindle which has a rotatable wheel means secured thereto. The track means includes a rear axle having a sprocket means secured thereto which is in operative engagement with the movable track. A wheel means having a hollow sleeve secured to its rim may be operatively secured to each of the opposite ends of the rear axle whereby the wheel means will drive the vehicle and will support the track means above the ground. The vehicle is converted from a conventional snow vehicle to a wheeled vehicle by the substitution of the wheel means for the skis and by the attachment of the wheel means to the rear axle of the track means.

---

Conventional snow vehicles or snowmobiles include a pair of steering skis at the forward end thereof for steering the vehicle and a track means at the rearward end thereof for propelling the vehicle. The snowmobile is designed for use on snow and/or ice surfaces which necessarily limits their use to the winter months. Some attempt has been made by manufacturers to convert the snowmobiles to a year-round vehicle by attaching wheels to the steering skis. These vehicles are unsatisfactory for use on ground surfaces due to the resulting cumbersome and clumsy design and due to the fact that the track means travels on the ground surface which is usually irregular and which may be covered by sticks, rocks, etc. The engagement of the track means with the ground surface causes an undue amount of water on the track and is to be avoided.

Therefore, it is a principal object of this invention to provide a convertible snow vehicle.

A further object of this invention is to provide a suspension system for a convertible snow vehicle.

A further object of this invention is to provide a suspension system for a convertible snow vehicle wherein a pair of wheels may be substituted for the steering skis and wherein the track means may be supported above the ground surface by a pair of driven wheel means operatively secured to the track means rear axle.

A further object of this invention is to provide a suspension system for a convertible snow vehicle which permits the vehicle to be quickly and easily converted from a ski-track vehicle to a wheeled vehicle.

A further object of this invention is to provide a convertible snow vehicle which presents an attractive appearance.

A further object of this invention is to provide a convertible snow vehicle which is highly maneuverable.

A further object of this invention is to provide a suspension system for a convertible snow vehicle which provides a comfortable ride.

A further object of this invention is to provide a suspension system for a convertible snow vehicle which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a front perspective view of the vehicle converted to a wheeled vehicle, with portions thereof cut away to more fully illustrate the invention;

FIG. 2 is a front perspective view of the vehicle illustrating the appearance thereof when the wheel means have been removed therefrom;

FIG. 3 is an enlarged sectional view as would be seen along lines 3—3 of FIG. 1;

FIG. 4 is a sectional view as seen along lines 4—4 of FIG. 3, the broken lines indicating the vertical movement of the spindle;

FIG. 5 is a sectional view as seen along lines 5—5 of FIG. 4;

FIG. 6 is a sectional view as seen along lines 6—6 of FIG. 5;

FIG. 7 is an exploded perspective view of the upper end of the front suspension system;

FIG. 8 is a side view of the rear suspension system with portions thereof cut away to more fully illustrate the invention;

FIG. 9 is a side view similar to FIG. 8 which illustrates the spring shock absorber in a compressed position;

FIG. 10 is a sectional view as seen along lines 10—10 of FIG. 8;

FIG. 11 is a sectional view as seen along lines 11—11 of FIG. 8; and

FIG. 12 is a sectional view as seen along lines 12—12 of FIG. 10.

The vehicle of this invention is generally designated by the reference numeral 10 and includes a forward end 12 and a rearward end 14. Vehicle 10 includes a frame means 16 which supports the nose cone 18, tunnel 20, seat 22 and track means 24.

The front suspension system of the vehicle is comprised of a pair of front suspension members 26 (only one of which is shown in the drawings) operatively secured to the frame means 16. A transverse support 28 is secured to frame means 16 by welding and has a front suspension member 26 secured to each of its opposite ends. Inasmuch as each of the front suspension members 26 are identical, only one will be described. The numeral 30 generally designates a hollow cylinder which is welded to the outer end of transverse support 28 in the manner best seen in FIGS. 3 and 4. As seen in FIG. 3, cylinder 30 is inclined so that its lower end 32 is positioned forwardly of its upper end 34. FIG. 4 is a front view of the front suspension member 26 and it can be seen that the lower end 32 of cylinder 30 is positioned outwardly of its upper end 34.

A spindle 36 is rotatably and slidably mounted in cylinder 30 and has its upper end 38 extending upwardly from the upper end thereof. Cylinder 30 is provided with a bushing 40 at its lower end which embraces spindle 36 as best illustrated in FIG. 4. A pair of tension spring holders 42 and 44 are welded to the exterior surface of cylinder 30 intermediate the length thereof and extend outwardly therefrom as best illustrated in FIGS. 3 and 4. As seen in FIG. 7, the upper end of spindle 36 is provided with a longitudinal key-way 46 formed therein. A steering arm collar 48 is mounted on the upper end of spindle 36 and has a key portion 50 which is received by key-way 46 so that the rotation of steering arm collar 48 will cause the rotation of spindle 36. A steering arm 52 is secured to steering arm collar 48 by welding or the like and extends forwardly and inwardly therefrom. The steering arm 52 is operatively secured by suitable linkage means to the steering bar 54 as would be the steering arm on the other front suspension member. Steering arm holddown plate 56 is positioned above collar 48 and rotatably embraces the upper end of spindle 36. A pair of bolts 58 and 60 extend through opposite ends of plate 56 as best seen in FIGS. 4 and 7. A pair of angle brackets 62 and 64 are welded to the exterior surface of cylinder 30 and are adapted to receive bolts 58 and 60 extending therethrough respectively. Plate 56 is maintained in position by means of the adjustment nuts 66 and 68 threadably received on bolt 58 and being positioned on opposite sides of the angle brackets 62 and by means of adjustment nuts 70 and 72 threadably received on bolt 70 and being positioned on opposite sides of the angle brackets 64.

A spindle locking collar 74 embraces the upper end of spindle 36 and has a set screw 76 threadably extending thereinto for engagement with the upper end of spindle 36 to prevent relative rotational and longitudinal movement between collar 74 and spindle 76. A tension spring holder 78 rotatably embraces the upper end of spindle 36 above collar 74 and has a pair of tension springs 80 and 82 operatively detachably secured to opposite sides thereof as best seen in FIG. 7. The lower ends of tension springs 80 and 82 are operatively detachably secured to tension spring holders 42 and 44 respectively.

Spindle 36 has a wheel means 84 rotatably mounted on the lower end thereof as illustrated in FIG. 1 and the spindle in the front suspension member at the other side of the vehicle has a wheel 86 rotatably mounted thereon. The numeral 88 generally designates a spindle which may be substituted for the spindle 36 as desired as will be explained later. A ski means 90 is operatively pivotally secured to the lower end of spindle 88 as illustrated in FIG. 2. A ski means 92 is operatively secured to a spindle identical to spindle 88 for attachment to the other front suspension member.

Track means 24 is driven by a conventional power means (not shown) and includes a rear axle 94 which extends across the rearward end of the track means. Rear axle 94 has a sprocket 96 secured to one end thereof which is in operative engagement with the track 98 of track means 24. Rear axle 94 would also be provided with a sprocket adjacent its other end which would be identical to sprocket 96. The track 98 is driven from the forward end thereof and the rotation of track 98 imparts rotation to the sprockets at the opposite ends of rear axle 94 which in turn would impart rotation to axle 94 since the sprockets are keyed to rear axle 94. As seen in FIG. 12, the outer end of rear axle 94 extends outwardly of the side of the track means 24 and the downwardly extending side 100 of tunnel 20. The numeral 102 designates a wheel means including a rim portion 104 which is secured to a driving hub 106 by bolts 108. Driving hub 106 includes a collar 110 which is secured thereto and which extends horizontally therefrom. Collar 110 embraces the outer end of axle 94 and is keyed thereonto for rotation therewith. Collar 110 is maintained on axle 94 by means of one or more set screws 112 extending through collar 110 and into engagement with axle 94. A track adjustment bracket 114 is secured to side 100 by bolts 116 and 118 extending through suitable openings formed therein. An angle bracket 120 is adjustably secured to bracket 114 by means of the bolts 116 and 118 extending through elongated slots 122 and 124 formed in bracket 120. An adjustment bolt 126 extends between the rearward ends of brackets 114 and 120 to permit the relative movement therebetween upon the loosening of bolts 116 and 118.

Pivot arm 128 is pivotally secured to bracket 120 by means of bolt 130 extending through the rearward end of arm 128 and bracket 120 as illustrated in FIG. 8. Arm 128 rotatably receives axle 94 extending therethrough and has a bearing cup means 131 secured to its inner surface which also embraces axle 94 and which is provided with a bearing means 132 therein. Axle 94 has a bearing collar 134 secured thereto which maintains the bearing means 132 in position as illustrated in FIG. 12. A shock absorber 136 of the spring type is pivotally secured at its upper end to side 100 by a bolt 138 and is pivotally connected at its other end to the forward end of arm 128 by a bolt 140. Shock absorber 136 is adapted to yieldably maintain the axle 94 and the arm 128 in the position seen in FIG. 8 and resists the upward pivotal movement thereof from the position of FIG. 8 to the position of FIG. 9. While the suspension system at only one side of the rearward end of the vehicle has been described, it should be noted that an identical suspension system would also be provided at the opposite rearward side of the vehicle.

The normal method of operation is as follows. The snowmobile may be converted from the wheeled vehicle of FIG. 1 to the snowmobile of FIG. 2 with a minimum amount of effort. Spindle 36 is removable from cylinder 32 by simply loosening set screw 76 which permits spindle 36 to be removed from the lower end thereof. Spindle 88 with the ski 90 attached thereto would then be inserted into the lower end of the cylinder 30 and set screw 76 would then be tightened into engagement with the upper end of the spindle 88. The same procedure would be followed for the suspension system at the other side of the forward end of the vehicle. Thus, it is only necessary to loosen one set screw 76 in each of the suspension systems to permit the removal of the spindle therefrom.

In use, the turning of the steering bar 54 will cause the spindle 36 to be turned due to the fact that collar 48 is keyed onto the upper end of spindle 36 and due to the fact that steering arm 52 is operatively connected to the steering bar 54. The rotation of collar 48 and spindle 36 with respect to cylinder 30 will not cause rotational movement of plate 56, holder 78, springs 80 and 82 or bolts 58 and 60. Spindle locking power 74 will rotate with spindle 36 between plate 56 and holder 78. The springs 80 and 82 act as shock absorbers and yieldably resist the upward movement of the spindle 36 with respect to the cylinder 30. If the wheel means 84 engages an obstruction or the like, spindle 36 will tend to move upwardly in cylinder 30 which will cause spindle locking collar 74 to move upwardly with respect to plate 56. The upward movement of spindle locking collar 74 causes holder 78 to also be moved upwardly which in turn stretches the springs 80 and 82 which yieldably resist the upward movement of holder 78 and collar 74. Spindle 36 is permitted to move upwardly and downwardly with respect to collar 48 since the key-way 46 is of sufficient length to permit the same. As seen in FIG. 4, a grease fitting 142 is provided on cylinder 30 to permit the insertion of grease within the interior thereof.

The wheels at the rearward end of the vehicle may be removed from the vehicle by simply loosening the set screws 112 in collar 110. When the wheels have been removed, the track will engage the ground surface but will be supported above the ground surface when the wheels have been secured to the opposite ends of the rear axle 94 as previously described. As previously stated, the operation of the track by the power means will cause rear axle 94 to be rotated which in turn will impart rotation to the rear wheels to cause the vehicle to be propelled. The shock absorbers which are pivotally secured to the pivot arms at each side of the vehicle absorb the shock imposed into the track means whether the ground engaging wheels are being utilized or the track is engaging the ground surface.

Thus, the vehicle can be converted from a ski-track arrangement as seen in FIG. 2 to the wheeled arrangement of FIG. 1 in a matter of seconds. The wheeled vehicle arrangement seen in FIG. 1 eliminates the skis from the forward end of the vehicle which provides a more attractive appearance and adds to the maneuverability of the device. The fact that the track means is supported above the ground when the wheeled vehicle arrangement is being utilized insures that the track will not be inadvertently damaged by contact with sticks, rocks, etc. The suspension system disclosed herein permits the conversion of a snow vehicle to a wheeled vehicle and also provides the utmost in riding comfort. Thus it can be seen that the device accomplishes at least all of its stated objectives.

It should also be noted that only one rear wheel need be driven but the preferred embodiment is to drive both of the rear wheels.

Some changes may be made in the construction and arrangement of my suspension system for a snow vehicle without departing from the real spirit and purpose of my invention.

I claim:

1. A convertible snow vehicle including,
a frame means,
a power means on said frame means,
a front suspension system operatively connected to said frame means,
a rear suspension system operatively connected to said frame means,
said frame means including a rearwardly extending centrally disposed tunnel portion,
a movable endless track means operatively connected to said power means for propelling the vehicle, said track means being operatively secured to said rear suspension system, said track means being at least partially enclosed by said tunnel means,
said front suspension system including spaced apart mounting means adapted to selectively and detachably receive surface engaging means,
surface engaging means connected to said mounting means,
steering means operatively connected with said surface engaging means for steering said vehicle,
and a wheel means adapted to be selectively operatively secured to said track means, said wheel means causing said track means to be supported above the ground, the operation of said track means causing said wheel means to propel the vehicle,
said rear suspension system including a driven axle means,
said wheel means including a pair of wheel members secured to opposite ends of said axle means, said wheel members being positioned outwardly of and on each side of said tunnel means.

2. The vehicle of claim 1 wherein said surface engaging means comprise first and second wheel members.

3. The vehicle of claim 1 wherein said surface engaging means comprise first and second ski members.

4. The vehicle of claim 1 wherein said axle means has a sprocket means secured thereto which is in operative engagement with said endless track means, said axle means being operatively pivotally secured to said frame means.

5. The vehicle of claim 1 wherein said pair of wheel members each include a hollow hub portion secured, thereto and extending horizontally therefrom, said hollow hub portion detachably receiving one end of said axle means.

6. The vehicle of claim 1 wherein said axle means has a sprocket means secured thereto which is in operative engagement with said track means, said axle means being operatively pivotally secured to said frame means, said first and second pivot arms embrace opposite ends of said axle means, each of said pivot arms including rearward and forward ends, each of said pivot arms being pivotally secured at their rearward ends to said frame means, each of said pivot arms being operatively secured at their forward ends to a shock absorber means secured to said frame means.

7. The vehicle of claim 1 wherein each of said mounting means includes a tubular sleeve having a spindle removably rotatably mounted therein, said spindle having a ski means secured to its lower end, said spindle being replaceable by another spindle having a wheel means rotatably mounted at the lower end thereof.

8. The vehicle of claim 1 wherein each of said mounting means includes a tubular sleeve having upper and lower ends, a spindle rotatably and slidably mounted in said sleeve and having a lower end portion extending from the lower end of said sleeve and an upper end portion extending from the upper end of said sleeve, a steering arm slidably mounted on the upper end portion of said spindle and being fixed thereto for rotation therewith, said steering arm being operatively connected to the vehicle steering means, a steering arm plate slidably and rotatably embracing said spindle above said steering arm, means securing said steering arm plate limiting the rotational and vertical movement thereof with respect to said sleeve, a collar secured to said spindle above said steering arm plate, and a spring means operatively secured at one end to said collar and operatively secured at another end to said sleeve adapted to yieldably resist the upward movement of said spindle with respect to said sleeve.

9. The vehicle of claim 8 wherein said spindle normally has a ski means secured to its lower end, said spindle being replaceable by another spindle having a wheel member secured thereto.

10. The vehicle of claim 8 wherein the lower end of said sleeve is positioned outwardly and forwardly of its upper end.

11. A vehicle, comprising,
a frame means including a rearwardly extending centrally disposed tunnel means,
a power means on said frame means,
a front suspension system operatively connected to said frame means and including a pair of spaced apart removable first and second wheel members pivotally connected to said frame means,
steering means connected to said first and second wheel members for steering the vehicle,
a rear suspension system operatively connected to said frame means,
a movable endless track means operatively connected to said power means and operatively secured to said rear suspension system, said tunnel means at least partially enclosing said track means,
said rear suspension system including a driven axle operatively connected to and driven by said track means,
third and fourth wheel members removably connected to opposite ends of said driven axle, said third and fourth wheel members being positioned outwardly of and on each side of said tunnel means adjacent the rearward end thereof,
said third and fourth wheel members causing said track means to be supported above the ground and out of contact therewith,
the operation of said track means causing said driven axle to be driven whereby said third and fourth wheel members propel the vehicle.

12. The vehicle of claim 11 wherein the removal of said third and fourth wheel members from said vehicle will cause said track means to be lowered into ground engagement whereby operation of the track means will propel the vehicle, said front suspension system adapted to have first and second ski members removably secured thereto for steering the vehicle when said first and second wheel members are removed from the vehicle.

(References on following page)

References Cited

UNITED STATES PATENTS

| | | | |
|---|---|---|---|
| 3,435,907 | 4/1969 | Imhoff | 180—5 |
| 1,276,035 | 8/1918 | Crane | 180—5 |
| 2,708,978 | 5/1955 | Robitaille | 180—5 X |
| 2,970,662 | 2/1961 | Hetteen | 180—5 |
| 3,023,824 | 3/1962 | Bombardier | 180—5 X |
| 3,336,994 | 8/1967 | Pederson | 180—9.24 X |
| 3,333,867 | 8/1967 | Schultze | 280—124 |

FOREIGN PATENTS

| | | |
|---|---|---|
| 1,210,483 | 9/1959 | France. |
| 457,708 | 3/1928 | Germany. |

RICHARD J. JOHNSON, Primary Examiner

U.S. Cl. X.R.

180—9.24, 9.3; 305—29; 280—7.12, 96.2